United States Patent [19]

Rojey et al.

[11] 4,448,031
[45] May 15, 1984

[54] PROCESS FOR COLD AND/OR HEAT PRODUCTION WITH USE OF CARBON DIOXIDE AND A CONDENSABLE FLUID

[75] Inventors: Alexandre Rojey, Garches; Jacques Cheron, Maisons Laffitte, both of France

[73] Assignee: Institut Francais du Petrole, Rueil-Malmaison, France

[21] Appl. No.: 456,463

[22] Filed: Jan. 7, 1983

[30] Foreign Application Priority Data

Jan. 7, 1982 [FR] France ................. 82 00272

[51] Int. Cl.³ ........................................... F25B 15/00
[52] U.S. Cl. ....................................... 62/101; 62/102; 62/112
[58] Field of Search ................... 62/101, 102, 112

[56] References Cited

U.S. PATENT DOCUMENTS

| | | |
|---|---|---|
| 1,781,541 | 11/1930 | Einstein et al. |
| 1,922,217 | 8/1933 | Randel. |
| 2,248,178 | 7/1941 | Kuenzli. |
| 2,290,532 | 7/1942 | Buffington. |
| 4,167,101 | 9/1979 | Rojey ................. 62/102 |

*Primary Examiner*—Lloyd L. King
*Attorney, Agent, or Firm*—Millen & White

[57] ABSTRACT

A process for cold and/or heat production using carbon dioxide, a solvent for carbon dioxide and a condensable fluid (F), comprising conducting an absorption/condensation step wherein carbon dioxide is absorbed in the solvent and the gaseous fluid (F) is condensed, a step of separation of the resultant liquid phases, a desorption step for the $CO_2$ solution, a mixing step and an evaporation step for the condensed fluid (F).

4 Claims, 4 Drawing Figures

PROCESS FOR COLD AND/OR HEAT PRODUCTION WITH USE OF CARBON DIOXIDE AND A CONDENSABLE FLUID

BACKGROUND OF THE INVENTION

This invention relates to a new process for heat and/or cold production by means of a cycle operated with carbon dioxide and a condensable fluid.

The prior art processes for cold and/or heat production by means of absorption cycles generally make use of the thermal effects occurring when absorbing and desorbing a solute in a solvent at distinct temperature levels which depend on the different operating pressures.

These processes require the use of pumps for circulating the solvent from a zone at a relatively low pressure to another zone at a higher pressure with the attendant known occurring such as possible degassing of the sucked or drawn solutions, or cavitation effects, so that substantial power consumption for this circulation and security is devices required to avoid the passage of high pressure fluid into the enclosures which are normally used at low pressure.

U.S. Pat. No. 4,311,019 illustrates, in its FIG. 1, the operation of a conventional absorption system, such as a conventionally used with usual associations by pairs such as water-ammonia or water-lithium bromide.

Absorption cycles have been modified by adding an inert gas whose object is to maintain a constant pressure in the different parts of the devices.

These installations, as described at page 744 of "Thermodynamique Technique" by M. Bailly, Bordas Editions, 1971, are usually employed for cold production, with, as a refrigeration agent, as an absorption agent and as an inert gas, respectively, ammonia, water and hydrogen. This poses security problems, particularly because ammonia toxicity and dangers resulting from hydrogen explosivity and ammonia flammability. The cycles using water as working fluid and a salt such as a lithium bromide have other disadvantages: very low operating pressure, i.e., possible icing and salt crystallization.

Another absorption cycle, described in U.S. Pat. No. 1,781,541, operates with the ammonia-water ($NH_3$-$H_2O$) association and an auxiliary condensable fluid such as butane. This cycle has been conceived for substantially isobaric working conditions of its different parts, the slight pressure variations being used to circulate the fluids in liquid or gas phase.

The device has however the major disadvantage of an uneven running since ammonia condensation can be avoided only with difficulty under the pressure and temperature conditions prevailing in the evaporator. The evaporation of butane then greatly decreases and the exothermic condensation of ammonia converts the evaporator to a heat source rather than a cold source.

SUMMARY OF THE INVENTION

The present invention thus has as an object a new process for producing cold and/or heat with the use of an absorption cycle, which process does not suffer from the above mentioned disadvantages.

The process of the invention is characterized by the use of a carbon dioxide gas phase which is subjected to a step of absorption in a liquid solvent phase followed with a desorption step at a higher temperature. It is also characterized by the use of a condensable gas preferably selected from the hydrocarbons and the halogenated hydrocarbons. The processes differs from the known process using ammonia in that no $CO_2$ liquid phase is formed and instead $CO_2$ gas is only absorbed in a solvent.

Carbon dioxide is a very common fluid which has a number of advantages, particularly a low price and a safe handling.

The hydrocarbons and halogenated hydrocarbons, particularly the chloro-fluoro substitution derivatives of methane and ethane are fluids of industrial use in the processes of cold and/or heat production. In addition to their non-toxic character, their high molecular weight prevents them being subjected to the very detrimental diffusion properties of hydrogen.

It has been found, and this is the object of the present invention, that, in contrast to what could be expected from the above observations, carbon dioxide can be profitably used in the presence of a condensable gas provided the process is operated as follows:

The process of the invention comprises the following steps of:

(a)—contacting a solvent liquid phase (S) with a gas phase comprising both an auxiliary fluid (F) and carbon dioxide, in an absorption/condensation step, so as to obtain a solution of carbon dioxide in the solvent (S) and a liquid phase of the fluid (F), the liquid phase of the fluid (F) being at least partly immiscible with the solution of carbon dioxide in the solvent (S), the fluid (F) being vaporizable in the conditions of step (e) and condensable in the conditions of step (a), and transferring the heat released by the absorption of carbon dioxide into the solvent (S) and the heat released by the condensation of the fluid (F) to an external fluid, (b)—separating the solution of carbon dioxide in the solvent (S) from the liquid phase of the fluid (F), (c)—supplying the solution of carbon dioxide in the solvent (S) to a desorption step and subjecting this solution to desorption conditions, the desorption heat being received from an external fluid, so as to obtain a solvent liquid phase of reduced carbon dioxide content and a vapor phase of high carbon dioxide content, and recycling said solvent liquid phase of reduced carbon dioxide content to the absorption/condensation step (a) to constitute therein the solvent liquid phase (S), (d)—admixing at least a portion of the liquid phase formed by condensation of the fluid (F), obtained in the absorption/condensation step (a) and separated in the step (b), with at least a portion of the carbon dioxide gas phase obtained in the step (c) of desorbing carbon dioxide from its solution in the solvent (S), (e)—subjecting the mixture obtained in step (d) to an evaporation step, the heat required for evaporating the fluid (F) being received from an external fluid, and recovering a gas phase composed of a mixture of fluid (F) vapor with carbon dioxide, and (f)—subjecting the gas phase obtained in step (e) to an absorption/condensation step (a).

According to a specific embodiment, the vapor phase of high carbon dioxide content, obtained in step (c), is admixed with an auxiliary liquid phase of a carbon dioxide solvent (T), so as to dissolve carbon dioxide in said liquid phase, the dissolution heat being supplied to an external medium, and the pressure is then decreased, so as to allow the release of dissolved carbon dioxide, the evolved gaseous carbon dioxide being the carbon dioxide admixed, in step (d), with the condensation liquid phase of the fluid (F).

In the latter case, a complete release of carbon dioxide from its solution is unnecessary before admixing it in step (d) with the condensation liquid phase of the fluid (F), and it is preferred to admix said expanded solution with said condensation liquid phase of the fluid (F) and to feed the resultant mixture to the step (e) where the evaporation of the fluid (F) is at least partly simultaneous with the release of carbon dioxide from its solution. When the evaporation has been completed, the desorbed liquid phase is separated from the gas phase containing the gaseous fluid (F) and the gaseous carbon dioxide; the desorbed liquid phase is fed back to said zone where the vapor phase of high carbon dioxide content, obtained in step (a), is admixed with an auxiliary liquid phase of carbon dioxide solvent.

The auxiliary solvent T may have the same composition as the main carbon dioxide solvent, or may have a different composition.

DETAILED DISCUSSION OF THE INVENTION

Figure 1:
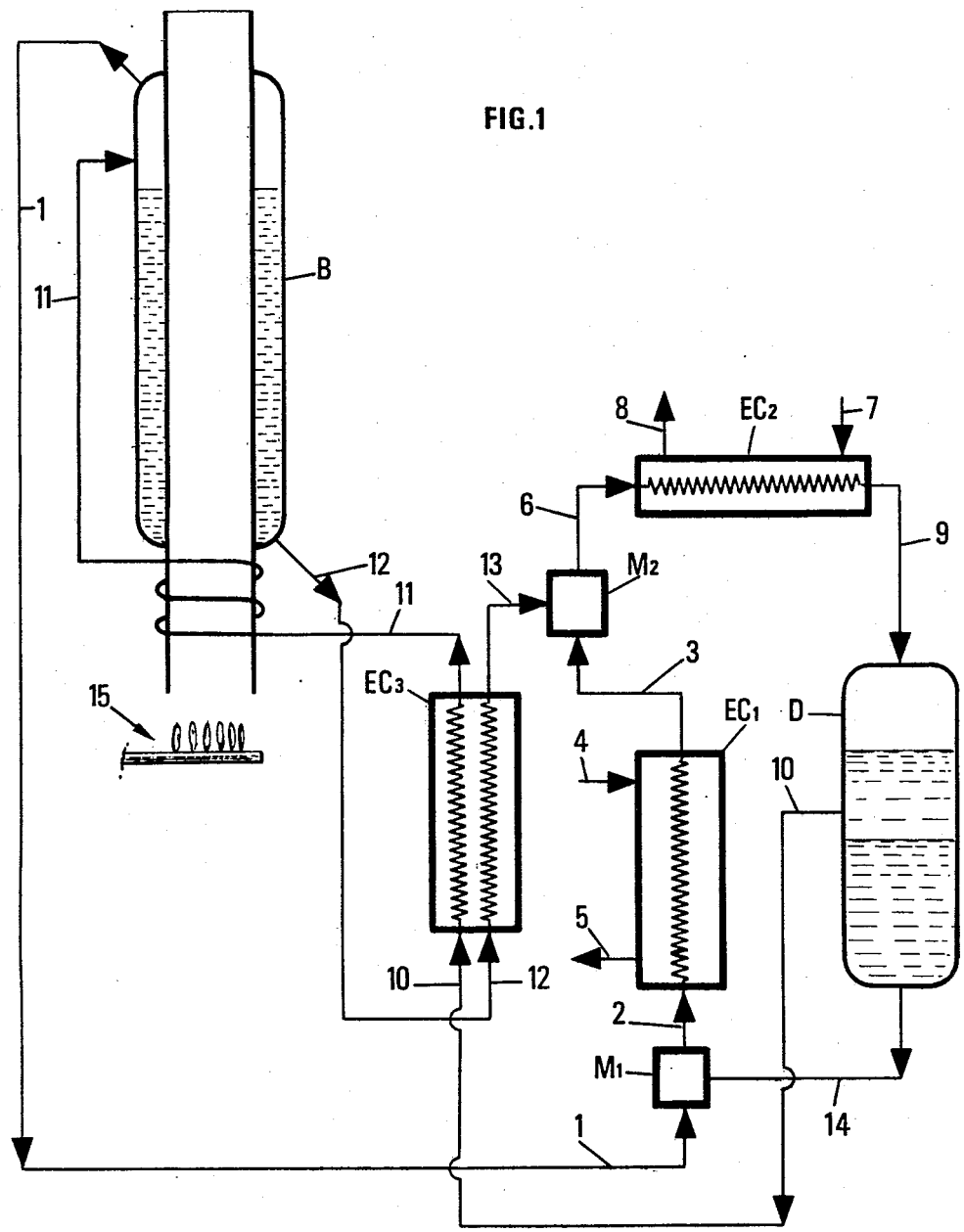
FIG. 1 represents a first embodiment of the invention.

Referring to the cycle of FIG. 1, the solution of carbon dioxide in an appropriate solvent (S) is heated in the boiler B by an external source 15.

Desorbed carbon dioxide is fed through duct 1 to a mixer M1 which receives, from duct 14, an amount of liquid halogen compound (or any other liquid auxiliary fluid) withdrawn from settler D.

The mixture of gaseous carbon dioxide with the liquid halogen compound is supplied through duct 2 to the exchanger (evaporator EC1 wherein the liquid phase is completely vaporized by the heat supplied from an external fluid (ducts 4 and 5). The mixture of the vapors is discharged through duct 3 and introduced into a mixer M2 which also receives solvent of reduced carbon dioxide content (duct 13).

The fluids are fed to an exchanger EC2 wherein carbon dioxide is absorbed by the solvent with heat transfer to an external fluid fed through duct 7 and discharged through duct 8.

The absorption of carbon dioxide strongly reduces the partial pressure of this gas in the vapor phase of the exchanger. Since the total pressure is unchanged, in the absence of an expansion valve, the partial pressure of the condensable gas increases. This fluid then condenses in the exchanger EC2 with additional heat transferred to the external fluid circulating through the ducts 7 and 8.

The solution of carbon dioxide in its solvent and the liquid immiscible with said solution are discharged through duct 9 and fed to the settler D. The immiscible liquid phases separate due to the difference in their specific gravities. The condensable auxiliary fluid, assumed to be heavier, is taken up from the bottom of settler D through line 14 and is fed to mixer M1.

The carbon dioxide solution, assumed to be lighter, is discharged through line 10, passed through exchanger EC3 for being heated therein and is then supplied to boiler B by gas stripping through line 11.

The solution of reduced carbon dioxide content is discharged through duct 12, transfers a part of its heat to exchanger EC3 and is supplied, through line 13, to the mixer M2.

Thus, in the case of operation as heat pump according to the above description, high temperature heat is supplied to the boiler B and low temperature heat is supplied to the evaporator EC1.

Useful heat at a medium temperature level is recovered in. exchanger EC2 wherein occurs an absorption of carbon dioxide and a condensation of an auxiliary fluid.

When working for cold production, the cold source is the evaporator EC1.

Figure 2:
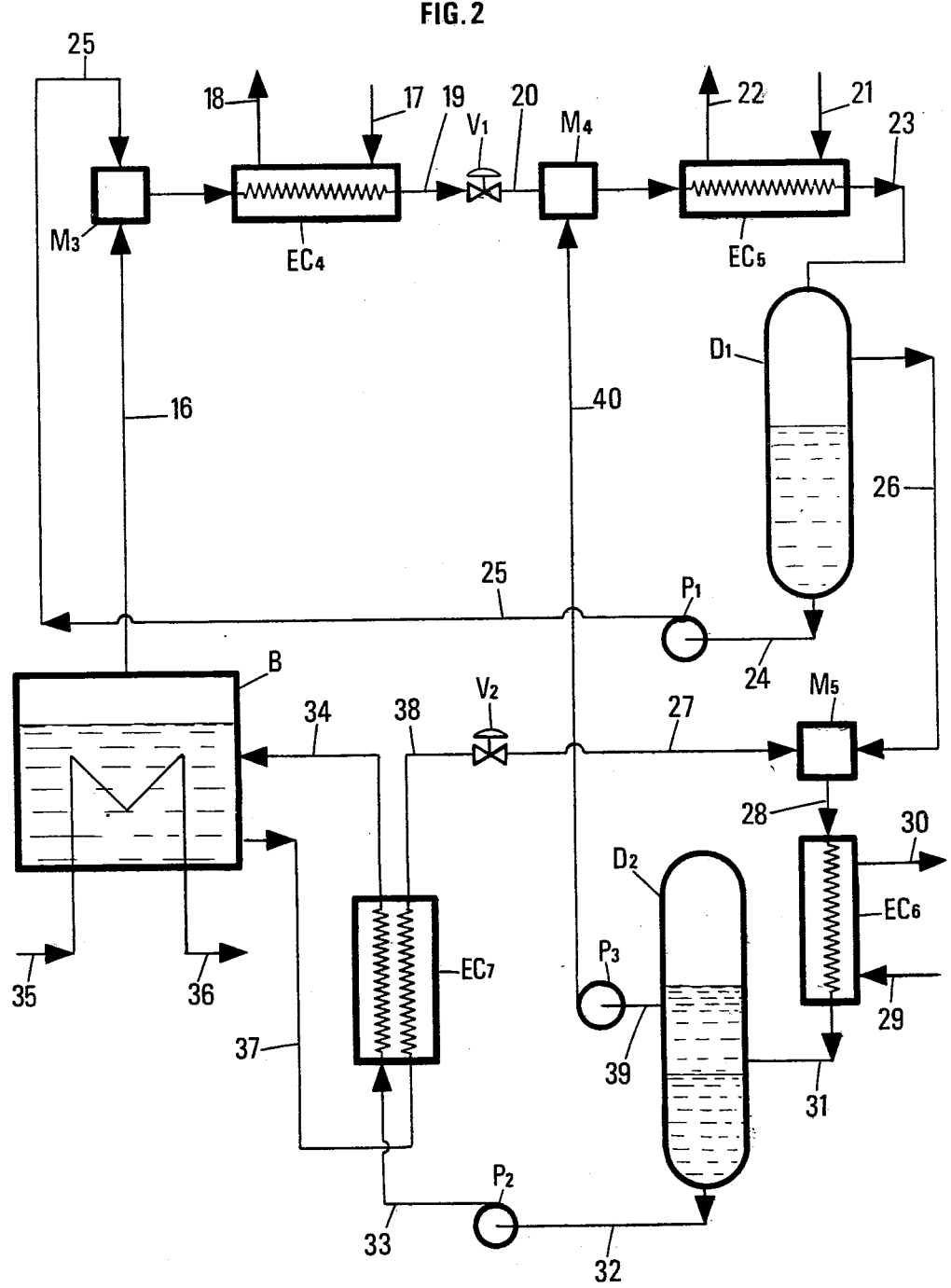
FIG. 2 represents another embodiment of the invention, which results in an increased production of cold or heat in the process.

Another way of performing the invention with the use of carbon dioxide, a solvent and a condensable auxiliary fluid, is shown in FIG. 2. Carbon dioxide is desorbed in boiler B and supplied through line 16 to the mixer M3 wherein is introduced a relatively rich solution of carbon dioxide in a solvent. The carbon dioxide content of said solution further increases in the exchanger EC4 wherefrom the absorption heat is removed and transferred to an external fluid supplied to the exchanger EC4 through line 17 and discharged through line 18.

The enriched solution is then fed through line 19 to an expansion valve V1. Line 20 takes up this solution which is admixed at M4 with a liquid phase of an auxiliary fluid and the whole is supplied to exchanger EC5 for partial vaporization therein with, heat being received from an external fluid (lines 21 and 22). The effluent is fed to settler D1 through line 23.

The liquid phase (solution of relatively decreased carbon dioxide content) is separated in settler D1 from the vapor phase containing carbon dioxide and vapors of the auxiliary fluid. The liquid phase discharged through line 24 from settler D1 is reintroduced through pump P1 and line 25 into the mixer M3.

The vapor phase discharged through line 26 is introduced into the mixer M5 which also receives, from line 27, a lean solution of the solute in the solvent. The whole is fed through duct 28 to the exchanger EC6 for absorption of carbon dioxide in the solution. The heat evolved during this reaction is recovered by an external fluid (lines 29 and 30).

The total pressure being unchanged, as a result of the $CO_2$ disappearance, the partial pressure of the auxiliary fluid increases up to its vapor pressure under the operating conditions in the exchanger EC6, thus producing a condensation of the auxiliary fluid to a liquid phase immiscible or only miscible to a slight extent with the $CO_2$ solution. This condensation results in a heat evolution also recovered by the external fluid.

The mixture of liquids recovered in line 31 is fed to a settler D2 wherein the non-miscible liquid phases separate by gravity. Assuming, for example, that the $CO_2$ solution is heavier, it is conveyed through line 32, pump P2 and line 33 to the exchanger EC7 for being heated before its introduction through line 34 into the boiler B.

Its temperature increase by means of an external fluid (lines 35 and 36), results in a desorption of carbon dioxide; and the solution of decreased carbon dioxide content is supplied through line 37, exchanger EC7 and line 38 to an expansion valve V2 to be recycled again through line 27 into the mixer M5. The auxiliary fluid, in the liquid state, is transferred through line 39, circulation pump P3 and line 40 to the mixer M4.

Thus, when the system operates as a heat pump according to the diagram of FIG. 2, heat at a high temperature level is supplied to the boiler B and heat at a low temperature level is supplied to the exchanger EC5. Useful heat at medium temperature level is recovered in exchanger EC4 and exchanger EC6. When working for cold production, the cold source is exchanger EC5.

The embodiment of the invention shown in FIG. 2 thus exhibits new advantages, as compared with the techniques of the prior art.

It has thus been found that, in a conventional absorption process, such as illustrated in FIG. 1 of French Pat. No. 2,454,591, the heat amount recoverable from the external medium or from an external fluid is substantially the same as the amount of heat fed at a high temperature level to the boiler.

According to the invention, as illustrated by the diagram of FIG. 2, the heat recovery from an external medium or from an external fluid in the exchanger EC5 is increased by the vaporization heat of the auxiliary fluid in a cycle operating only with cheap and safe materials such as $CO_2$, usual solvents and hydrocarbons or halogenated compounds.

The fluid (F) must conform to essential conditions:
1.—It must be at least partly immiscible with the solution of carbon dioxide in the solvent (S).
2.—At the output temperature of the step of carbon dioxide absorption in the solvent (S), it must have a lower vapor pressure than the total pressure prevailing in the evaporation step.

Any liquid satisfying the above conditions and able to reversibly dissolve carbon dioxide, (i.e., able to liberate carbon dioxide by subsequent heating of the solution), can be used as the solvent S. Provided this condition of reversibility is fulfilled, the solvents can belong to any chemical family and, for example, to the following families: amines, particularly alkanolamines, ketones, amides, ethers, alcohols, sulfones, sulfoxides, carbonates, carboxylic esters or phosphoric esters. Specific solvents, mentioned as examples, are water, diethylene glycol, N-methyl pyrrolidone, tri-n-butyl phosphate, sulfolane, dimethylsulfoxide, propylene carbonate, glycol triacetate, methoxy diethylene glycol acetate, polyethylene glycol dimethylether, methanol, solutions of sodium carbonate and potassium carbonate, methyl cyanacetate, dimethyl formamide, glutaronitrile, oligoethylene glycol methyl isopropyl ethers and the aqueous solutions of mono-, di- or tri-ethanolamine, mono-, di- or tri-propanolamine or morpholine.

The fluid (F) may be a fluid whose volatility is similar to that of carbon dioxide and may be, for example, a hydrocarbon having a number of carbon atoms from 3 to 10 or a halogenated hydrocarbon having 1 to 4 carbon atoms such as trichlorotrifluoroethane (R 113), tetrachlorodifluoroethane (R 112), chlorodifluoromethane (R 22), chloropentafluoromethane (R 115), dichlorodifluoromethane (R 12), dichlorofluoromethane (R 21), chlorodifluorobromomethane (R 12 B1), dichlorotetrafluoroethane (R 114), or an alcohol such as butanol or pentanol, a ketone such as methylisobutylketone, an ether such as methyl-n-butyl ether, dipropylether or dibutylether.

A preliminary test can easily determine whether a particular mixture of a fluid (F) with a solvent complies with the conditions of the invention. It will thus be ascertained that the fluid (F) in the liquid state is at least partly immiscible with the solution of carbon dioxide in the solvent (S) and optionally with the solvent (T) and that the fluid (F) can vaporize under the conditions of step (e) and is condensable under the conditions of step (a).

The selection of the best fluid (F) depends, for a given application, on the working temperatures.

The fluid (F) must not necessarily be a pure substance and may consist of a mixture of two or more distinct constituents. The composition of the mixture determines the value of the vapor pressure of the mixture and it is thus possible to operate the process at optimum conditions.

The second condition defining the fluid (F) imposes that the variation of the vapor pressure of the fluid (F) between the temperature of the evaporation step (e) and the temperature of the absorption step (a) be lower than the vapor pressure of carbon dioxide at the temperature selected for the evaporator (e).

The process is illustrated by examples 1 and 2.

EXAMPLE 1

Figure 3:
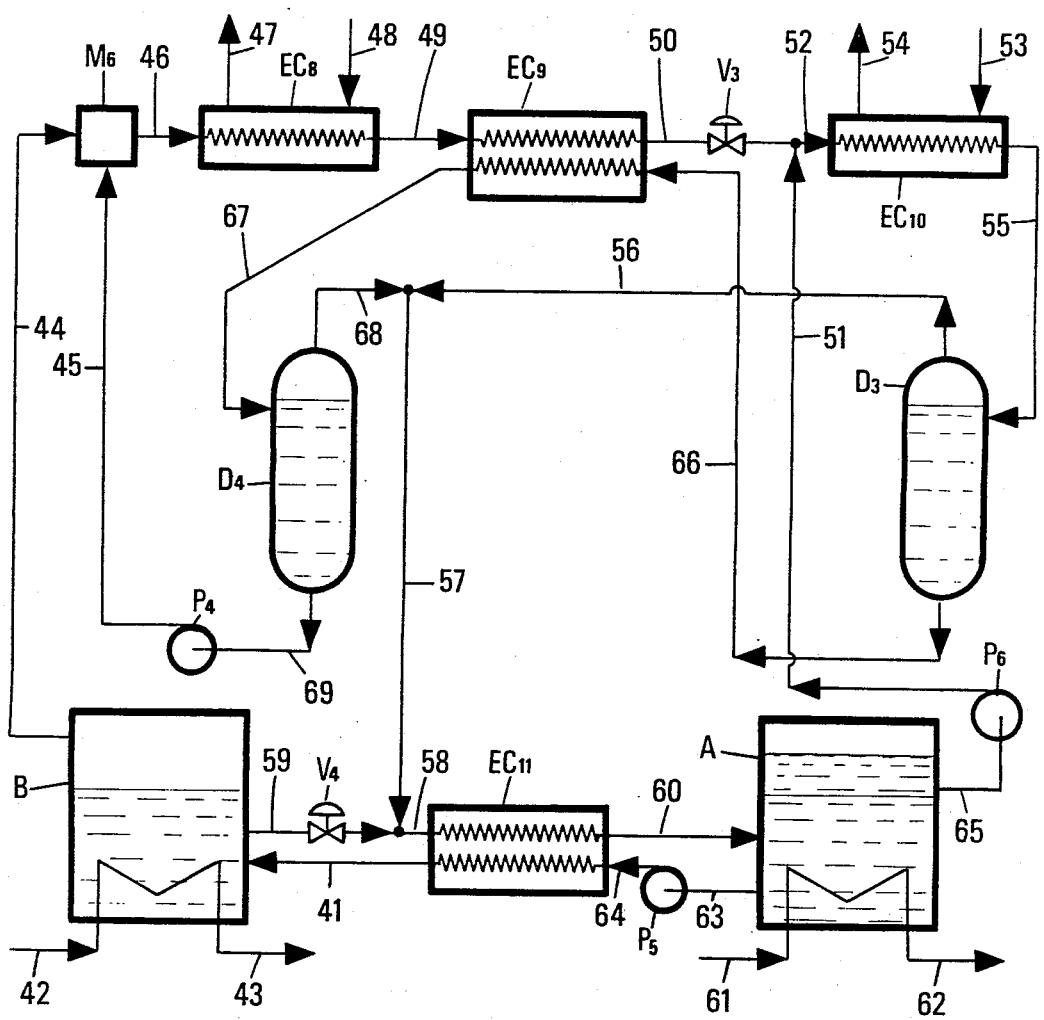
FIG. 3 illustrates an embodiment of the invention using carbon dioxide, an 8 N aqueous solution of diethanolamine and isopentane.

Example 1 is described with reference to the diagram of FIG. 3. In this example, carbon dioxide is absorbed and desorbed in two eight normal (8 N) aqueous solutions of diethanolamine (DEA) at different carbon dioxide concentrations, the auxiliary working fluid being isopentane iC5.

A liquid phase of carbon dioxide with a molar ratio of 0.15 (ratio of the number of moles of $CO_2$ to the number of moles of DEA in the aqueous solvent) is supplied at a temperature of about 150° C. through line 41 to a boiler B. An external fluid (lines 42 and 43) supplies sufficient thermal power (10 KW) to raise the temperature of the liquid phase to 160° C. The temperature increase results in the desorption of carbon dioxide whose pressure over the liquid phase increases to about 20 atm. The carbon dioxide content of the liquid phase decreases simultaneously and the above defined molar ratio decreases to 0.06.

The vapor phase of high carbon dioxide content is supplied through line 44 to the mixer M6 wherein this vapor phase intimately contacts a liquid phase of $CO_2$ in an aqueous solution of DEA fed through pump P4 and line 45 at a hourly feed rate of 661 l/h.

This liquid phase recovered from a desorption step has a $CO_2$/DEA molar ratio of 0.575.

The mixture is introduced through duct 46 into an exchanger EC8 wherein carbon dioxide is absorbed in the liquid phase and the heat released by this absorption is transferred to an external fluid (lines 47 and 48).

Provided the heat exchange is limited to a temperature of 40° C., the obtained aqueous amine solution has a dissolved $CO_2$ content, expressed as its new $CO_2$/DEA molar ratio, of 0.72.

The mixture is discharged through duct 49 and passed through exchanger EC9 to continue the $CO_2$ absorption while decreasing the temperature of the aqueous solution to 5° C. in the exchanger EC9. The $CO_2$ content of the aqueous DEA solution simultaneously increases up to a $CO_2$/DEA molar ratio of 0.83.

This liquid phase of increased $CO_2$ content is discharged from the exchanger EC9 through line 50 and is expanded from 20 atm to 1.2 atm through the expansion valve V3.

Liquid isopentane at a temperature of about 10° C. is supplied through duct 51 to form a liquid-liquid emulsion in line 52. In the exchanger EC10, isopentane evaporates and $CO_2$ is simultaneously desorbed from the aqueous $CO_2$ solution.

The heat, at a low temperature level required for this double transformation is supplied to the system by an external fluid fed through line 53 and discharged through line 54. The thermal power supplied amounts to 10,360 watts, which represents a 19% gain as compared with the thermal power consumed by the mere desorption of carbon dioxide (8,710 watts). The output temperature of EC10 is 0° C.

A gaseous mixture of $CO_2$ and isopentane and a liquid phase of aqueous DEA solution of decreased $CO_2$ content (molar ratio of 0.675) is discharged through line 55 at 0° C. under a total pressure of 1.55 atmosphere (the total of the two partial pressures of 1.2 atm for $CO_2$ and 0.35 atm for isopentane).

The separation of the gas and liquid phases takes place in the settler D3.

The gas phase of $CO_2$ and isopentane is discharged through line 56 and receives a carbon dioxide fraction withdrawn from a settler D4 before being supplied through lines 57 and 58 to the exchanger EC11 with a liquid phase at 160° C., expanded through valve V4 and discharged through line 59 from boiler B. The $CO_2$ gas is partially absorbed in the solvent solution in exchanger EC11 with heat evolution, said heat being transferred to an aqueous solution of DEA after its passage through absorber A.

In the output of the exchanger EC11 at a temperature of 65° C., carbon dioxide yet remains in the gas phase. The mixture of gas and liquid phases is conducted through line 60 to the absorber A.

A cooling circuit (lines 61 and 62) recovers the heat released by the absorption of $CO_2$ into the amine solution and the heat of isopentane condensation to 32° C.; the partial pressure of $CO_2$, in equilibrium with the solvent solution, amounts to 1.2 atm. The total pressure in EC10 is 1.55 atm; the pressure drop between the evaporator-desorber EC10 and the absorber A amounting to about 0.09 atm, the partial pressure of isopentane in the absorber amounts to 1.26 atm, corresponding to the saturating vapor pressure of this compound at 32° C. Isopentane condenses, simultaneously with the partial absorption of $CO_2$ in the aqueous DEA solution.

As liquid isopentane and the aqueous solution have low mutual solubility, the liquid phases separate in the absorber A.

The aqueous amine solution containing carbon dioxide (molar ratio of 0.5) is passed through line 63, pump P5, line 64 and exchanger EC11 to be preheated before its introduction through line 41 into boiler B.

Liquid isopentane is re-introduced into exchanger EC10 through line 65, circulation pump P6 and line 51.

The liquid phase separated in settler D3, as recovered from the desorption step in exchanger EC10, is passed through line 66 and heated in exchanger EC9 up to 35° C. wherein a portion of its carbon dioxide content continues to desorb. At the output of exchanger EC9, the liquid phase of decreased $CO_2$ content (molar ratio $CO_2$/DEA of 0.575) is taken up in line 67. Gas and liquid separate in settler D4 and there are obtained, through line 68, a gas phase of $CO_2$ which is fed back to line 57 and, through line 69, a liquid phase which is sucked by pump P4 before its supply, through duct 45, to the mixer M6.

The use of the process of the invention, wherein an absorption-desorption cycle using carbon dioxide is associated with a circuit of an auxiliary fluid, results in the case of this example 1, in an increase of the low temperature power consumed by the evaporator-desorber EC10 of 1,650 watts to be compared with the 8,710 watts required without isopentane.

The performance coefficient of this system operating as a heat pump, defined as the ratio of the recoverable heat to the heat of high temperature level, increases from 18,710/10,000 (1.87) to (18,710+1,650)/10,000 (2.03).

EXAMPLE 2

Figure 4:
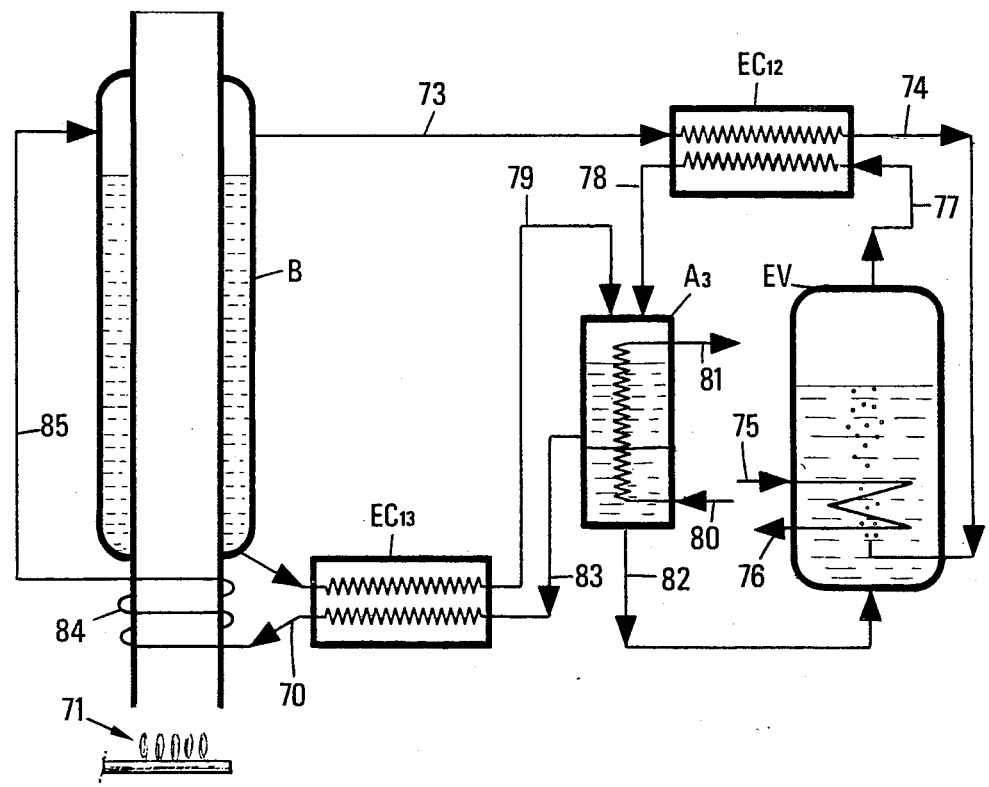
FIG. 4 relates to another embodiment of the invention wherein the fluids circulation does not require external mechanical power.

Example 2 is illustrated by FIG. 4. The invention is applied to a process using carbon dioxide, an aqueous solution of diethanolamine and a compound such as chlorodifluoromethane (R 22).

This non-limitative example 2 illustrates the advantageous use of carbon dioxide with the same solvent as in example 1, however, with a system which does not necessitate auxiliary power to circulate the fluids thanks to the vaporization and the subsequent condensation of a fluid such as R 22.

The aqueous solution of diethanolamine (DEA) is supplied through line 70 to the boiler B where it is heated up to 120° C. thanks to the heat supply from an external source 71.

The molar ratio defined as the number of moles of $CO_2$ divided by the number of moles of DEA in the solution amounts to 0.3 and the $CO_2$ partial pressure above the solution amounts to 15 atmospheres. Since the partial pressure of the aqueous solution is very low, the pressure in boiler B is thus near of 15 atmospheres.

The gas phase consisting essentially of $CO_2$ is extracted through line 73 and fed to exchanger EC12; it is discharged at a lower temperature through line 74 and fed to evaporator EV wherein it bubbles through liquid R 22.

The passage of the $CO_2$ vapor phase through liquid R 22 results in a partial vaporization thereof and in the cooling of the phases present in evaporator EV. The external circuit illustrated by the coil comprising the input line 75 and the output line 76 maintains the temperature in EV at about 0° C., which corresponds to a partial pressure of chlorodifluoromethane of 5 atmospheres. Since the enclosures are at substantially equal pressures, the partial pressure of carbon dioxide above the liquid phase in the evaporator is near a pressure of 10 atmospheres.

The gas phase which thus consists of a mixture of $CO_2$ and R 22 is discharged through line 77, reheated in exchanger EC 12 and supplied through line 78 to the absorber A 3.

Line 79 is used to return the aqueous diethanolamine solution of decreased carbon dioxide content.

In the absorber, where the output temperature of the products is maintained at about 38° C. by circulating an external fluid (lines 80 and 81), the total pressure is substantially constant and near that of the evaporator EV (15 atm.). The thermal conditions and the concentration of the DEA solution are such that $CO_2$ of the gas phase is absorbed. Its residual partial pressure is lower than 0.1 atm. The residual vapor phase thus consists essentially of R 22 at a pressure near 15 atm, at which it condenses as a liquid phase immiscible with the aqueous DEA solution.

The condensate is returned through duct 82 to the evaporator EV. The aqueous DEA solution of increased $CO_2$ content is discharged at about 38° C. through duct 83; it is heated therein by a cross-stream from the boiler, which results in a release of a fraction of the absorbed $CO_2$ gas.

This release increases in coil 84 heated by the source 71, so that the liquid-vapor mixture flows up (gas-lift) in line 85.

The process illustrated by FIG. 4 is only an example of one embodiment of the invention; many modifications of the exchangers may be adopted to transfer thermal power at different points of the above cycle.

The running conditions in the examples must not be construed as limitative.

Other systems using carbon dioxide may be considered.

The solvent for carbon dioxide may also be water alone or an organic solvent; the auxiliary working fluid may also be a hydrocarbon, a halogenated hydrocarbon or a member of the alcohol family.

The process may be conceived at quite variable thermal powers ranging from a few hundreds of watts up to several megawatts.

Quite different fittings may be used to apply the process of the invention.

The exchangers may be for example, of the tube-and-calender type or plate type exchangers.

The absorption and desorption steps may be carried out in columns of the type commonly used in chemical engineering to conduct operations of this type, with plates or packings or other devices, optionally with mechanical stirring.

The temperature of the desorption or evaporation steps in the evaporator may usefully range from −40° C. to +80° C.

The condensation or absorption temperature may be, for example, in the range from +20° to +120° C.

The heating temperature of the boiler may be selected, for example, between 80° and 250° C.

The device is generally conceived to operate at a maximum pressure lower than 50 atmospheres.

What is claimed is:

1. A process for cold and/or heat production
   (a)—contacting a solvent liquid phase (S) with a gas phase comprising both an auxiliary fluid (F) and carbon dioxide, in an absorption/condensation step, so as to obtain a solution of carbon dioxide in the solvent (S) and a liquid phase of the fluid (F), the liquid phase of the fluid (F) being at least partly immiscible with the solution of carbon dioxide in the solvent (S), the fluid (F) being vaporizable under the conditions of the hereinafter set forth step (e) and condensable under the conditions of step (a), and transferring the heat released by the absorption of carbon dioxide into the solvent (S) and the heat released by the condensation of the fluid (F) to an external fluid,
   (b)—separating the solution of carbon dioxide in the solvent (S) from the liquid phase of the fluid (F),
   (c)—supplying the solution of carbon dioxide in the solvent (S) to a desorption step and subjecting this solution to desorption conditions, the desorption heat being received from an external fluid, so as to obtain a solvent liquid phase of reduced carbon dioxide content and a vapor phase of high carbon dioxide content, and recycling said solvent liquid phase of reduced carbon dioxide content to the absorption/condensation step (a) to constitute therein the solvent liquid phase (S),
   (d)—admixing at least a portion of the liquid phase formed by condensation of the fluid (F), obtained in the absorption/condensation step (a) and separated in the step (b), with at least a portion of the carbon dioxide gas phase obtained in the step (c) of desorbing carbon dioxide from its solution in the solvent (S),
   (e)—subjecting the mixture obtained in step (d) to an evaporation step, the heat required for evaporating the fluid (F) being received from an external fluid, and recovering a gas phase composed of a mixture of fluid (F) vapor with carbon dioxide, and
   (f)—subjecting the gas phase obtained in step (e) to an aborption/condensation step (a).

2. A process according to claim 1, wherein, in an additional step (c'), subsequent to step (c), the vapor phase of high carbon dioxide content obtained in step (c) is admixed with an auxiliary liquid phase of a solvent for carbon dioxide, so as to dissolve carbon dioxide in said auxiliary liquid phase, the dissolution heat is transferred to an external medium and the pressure is decreased, so as to desorb dissolved carbon dioxide, the desorbed carbon dioxide gas constituting at least a portion of the carbon dioxide which is admixed in step (d) with the condensation liquid phase of the fluid (F).

3. A process according to claim 2, wherein the carbon dioxide gas admixed in step (d) with the condensation liquid phase of the fluid (F) is at least partly present as its solution in the expanded auxiliary liquid phase of the solvent for carbon dioxide, the desorption of carbon dioxide is continued in step (e), so as to be at least partly simultaneous with the evaporation of the fluid (F), the resultant desorbed liquid phase is separated from the gas phase comprising the gaseous fluid (F) and the gaseous carbon dioxide and at least a portion of the liquid phase desorbed in step (c) is fed back to step (c').

4. A process according to claim 1, 2 or 3, wherein the fluid (F) is a hydrocarbon or a halogenated hydrocarbon and the solvent (S) is an aqueous amine solution.

* * * * *